(12) United States Patent
Bottger

(10) Patent No.: US 12,486,864 B2
(45) Date of Patent: Dec. 2, 2025

(54) COUPLING LINK ASSEMBLY

(71) Applicant: Timothy Bottger, Brooklyn Park, MN (US)

(72) Inventor: Timothy Bottger, Brooklyn Park, MN (US)

(*) Notice: Subject to any disclaimer, the term of this patent is extended or adjusted under 35 U.S.C. 154(b) by 92 days.

(21) Appl. No.: 18/126,654

(22) Filed: Mar. 27, 2023

(65) Prior Publication Data
US 2024/0280134 A1   Aug. 22, 2024

Related U.S. Application Data

(60) Provisional application No. 63/324,048, filed on Mar. 26, 2022.

(51) Int. Cl.
| | | |
|---|---|---|
| F16B 45/02 | (2006.01) | |
| A45F 5/02 | (2006.01) | |
| A63B 29/02 | (2006.01) | |
| F16M 13/04 | (2006.01) | |
| A45F 5/00 | (2006.01) | |
| A62B 35/00 | (2006.01) | |

(52) U.S. Cl.
CPC ............ F16B 45/023 (2021.05); A45F 5/021 (2013.01); A63B 29/02 (2013.01); F16M 13/04 (2013.01); *A45F 5/1575* (2025.01); *A62B 35/0025* (2013.01)

(58) Field of Classification Search
CPC .... F16B 45/023; F16B 45/024; F16B 45/026; F16B 45/036; F16B 45/00; F16B 45/02; F16B 45/015; F16B 45/008; A45F 5/021; F16G 11/14; F16G 11/143; Y10T 24/45272; Y10T 24/45277
USPC ............................................... 242/153, 156.1
See application file for complete search history.

(56) References Cited

U.S. PATENT DOCUMENTS

| | | | | |
|---|---|---|---|---|
| 5,638,584 | A | * | 6/1997 | De Anfrasio .............. B62J 7/08 24/598.5 |
| 6,938,306 | B2 | * | 9/2005 | Joubert ................. F16B 45/012 24/265 H |
| 7,712,195 | B1 | * | 5/2010 | Selby ...................... F16G 11/00 24/301 |
| 9,861,839 | B2 | * | 1/2018 | Perner ................ A62B 35/0075 |
| 2005/0071961 | A1 | * | 4/2005 | Maurice ............... F16B 45/036 24/599.7 |
| 2012/0192385 | A1 | * | 8/2012 | Burdett ................. F16B 45/036 24/369 |
| 2016/0341239 | A1 | * | 11/2016 | Inkavesvaanit ....... F16B 45/036 |
| 2017/0307004 | A1 | * | 10/2017 | Cardella .............. F16B 45/023 |
| 2022/0007824 | A1 | * | 1/2022 | Chabod ................ F16B 45/023 |

* cited by examiner

Primary Examiner — Jack W Lavinder
(74) Attorney, Agent, or Firm — UNDERWOOD & ASSOCIATES, LLC

(57) ABSTRACT

A coupling link includes a substantially C-shaped rigid core structural member, an overmold of a plastic material that substantially follows the contour of the rigid core structural member and provides an additional thickness thereto, and a gate member configured to shift between open and closed configurations, wherein in the closed configuration, a closed loop is formed in the coupling link.

12 Claims, 10 Drawing Sheets

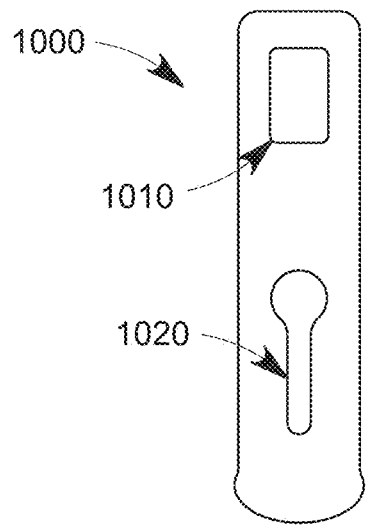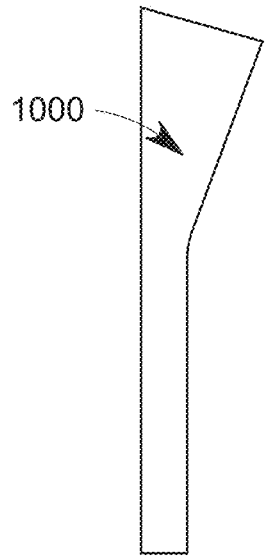
FIG. 10A  FIG. 10B
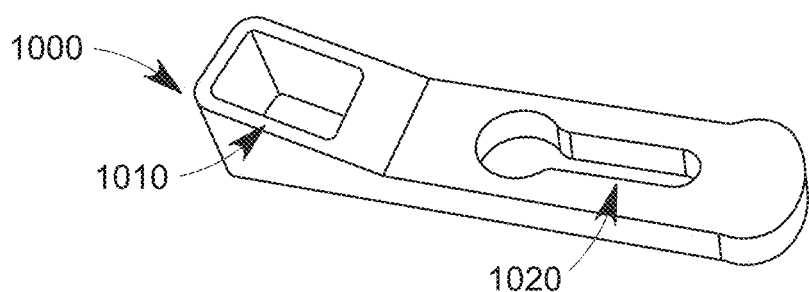
FIG. 10C

COUPLING LINK ASSEMBLY

REFERENCE TO RELATED APPLICATIONS

This application claims priority to and the benefit under 35 USC § 119(e) of U.S. Provisional Patent Application No. 63/324,048, filed on Mar. 26, 2022, the contents of which are incorporated by reference in their entirety as if fully set forth herein.

STATEMENT REGARDING FEDERALLY SPONSORED RESEARCH OR DEVELOPMENT

None.

TECHNICAL FIELD

This disclosure relates to systems and methods for a coupling link with a wire gate closure. In particular, this disclosure relates to a coupling link for use in, but not limited to rock and/or ice climbing.

BACKGROUND

Coupling links are shackles used in a variety of applications, such as climbing and other sports, rescue, and as a tool for organizing and keeping various tools or other components together. A carabiner (or karabiner) is one such shackle that is ubiquitous in the sport of mountain and ice climbing (among others). A carabiner typically includes a metal loop with a spring-loaded gate. The gate is configured to swing open to allow objects (such as rock climbing tools) to enter the metal loop; however, the gate is constantly urged to revert to the closed configuration, thereby enclosing and securing the object within the metal loop.

Coupling links are commercially available in a variety of sizes and types, some of which are designed for a particular functionality. Likewise, coupling links are formed from a variety of materials which provide variability in strength and reliability.

The sport of ice and rock climbing can subject a climber's tools to cold, sometimes extreme temperatures that can affect the tensile strength of coupling links, leading to breakage. Furthermore, climbers often carry many tools with them via carabiners fastened to a climbing belt. The climbing belt can become cluttered while attempting to carry items such as climbing picks, ice screws, leashes, ropes and other carabiners, all of which can be difficult to manage especially while wearing gloves or mittens.

Accordingly, an improved coupling link that is lightweight, impervious to failure due to cold weather and that provides an unencumbered, improved attachment to a climber's belt is an unmet need in the art.

SUMMARY

In general, a link assembly is provided that exhibits exceptional structural strength at reduced weight. In one exemplary embodiment, a coupling link includes a substantially C-shaped rigid core structural member, an overmold of a plastic material that substantially follows the contour of the rigid core structural member and provides an additional thickness thereto, and a gate member configured to shift between open and closed configurations, wherein in the closed configuration, a closed loop is formed in the coupling link.

In a first general aspect, a coupling link assembly is disclosed. The coupling link assembly includes a rigid, substantially C-shaped structural member formed of a metal or metal alloy. The structural member itself includes an upper arm portion having an upper terminus, a lower arm portion having a lower terminus, and a spine portion between the upper arm portion and the lower arm portion. The coupling link assembly further includes a gate connected to the upper terminus, moveable between an open position and a closed position with respect to the lower terminus, and an overmold of a rigid plastic material substantially surrounding the structural member.

In one embodiment, the structural member is formed of steel or stainless steel.

In one embodiment, the overmold is composed of Nylon 6/6 with a glass fill. The overmold is preferably composed of a glass fill in the range of 25% to 35% by weight with 30% by weight being optimal.

In one embodiment, a portion of the structural member protrudes through the overmold between and including an inside surface between the upper arm portion and the lower arm portion.

In one embodiment, a portion of the structural member protrudes through the overmold along an inner surface of the lower arm portion, an inner surface of a lower elbow portion between the lower arm portion and the spine, and a portion of an inner surface of the spine.

In one embodiment, the overmold includes at first and second protrusions on a top surface of the upper arm portion to form a tool support surface therebetween. In a related embodiment, the first protrusion is adjacent the upper terminus, and the second protrusion is adjacent an upper elbow formed between the spline and the upper arm portion. In yet another related embodiment, the tool support surface includes a plurality of ridges for accommodating a plurality of tools. The coupling link assembly can include a third protrusion formed on an outside surface of the overmold on the spine portion, proximal to the upper elbow. In a related embodiment, the coupling link assembly further includes a first keeper. The first keeper includes a body formed of a resiliently flexible material, an upper gripping portion and a lower portion including an elongate aperture adjacent to the gripping portion. The first keeper is configured to bias the upper elbow against an attachment member of a climbing belt or harness to restrict movement of the coupling link.

In one embodiment, the coupling link assembly further includes a first resiliently flexible coupling member, including a first aperture configured to allow the lower arm portion to extend therethrough, and a second aperture having a keyhole shape, a second resiliently flexible coupling member, including an elongate spine having an aperture at a proximal end portion of the spine that allows the upper arm portion to extend therethrough, and a plurality of spine protrusions extending from the spine. The keyhole aperture of the first coupling member is configured to allow the spine and the plurality of spine protrusions to be urged therethrough. The spine protrusions are configured to pass through the keyhole aperture in a forward direction but catch the first coupling member when moving in a reverse direction to prevent the spine protrusion from passing through the keyhole aperture. In a related embodiment, the spine protrusions are triangular, and each spine protrusion of the plurality of the spine protrusions are oriented in the same plane.

In a second general aspect, a coupling link assembly includes a substantially C-shaped, rigid structural member. The rigid structural member includes a first terminus on an upper arm, a second terminus on a lower arm, and a spine section between the first and the second arm. The first arm, the second arm and the spine are oriented to cooperatively form the substantially C-shaped rigid structural member. The coupling link assembly further includes a plastic overmold, substantially covering the structural member and a gate member having proximal and distal end portions, wherein the proximal end portion is connected to the first terminus and is configured to swing between open and closed positions. In the closed position the gate is biased against the second terminus by a spring attached proximal to the first terminus.

In one embodiment of the second general aspect, the rigid structural member is centrally located within the plastic overmold. In another embodiment, a portion of the structural member protrudes through the plastic overmold along a portion of the lower arm. In yet another embodiment, the overmold of the upper arm includes a shelf portion for securing one or more tools.

In a third general aspect, a coupling link assembly includes a coupling link. The coupling link includes a rigid C-shaped load bearing member with an overcoat of a resilient plastic material, and a gate member configured to open and close to allow tools to be hung from an inside surface of the coupling link.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

DESCRIPTION OF DRAWINGS

The present embodiments are illustrated by way of the figures of the accompanying drawings, which may not necessarily be to scale, in which like references indicate similar elements, and in which:

FIGS. 10A-10C show a second component of a keeper assembly that is cooperatively used with the component of FIG. 9.

DETAILED DESCRIPTION OF ILLUSTRATIVE EMBODIMENTS

Figure 1:
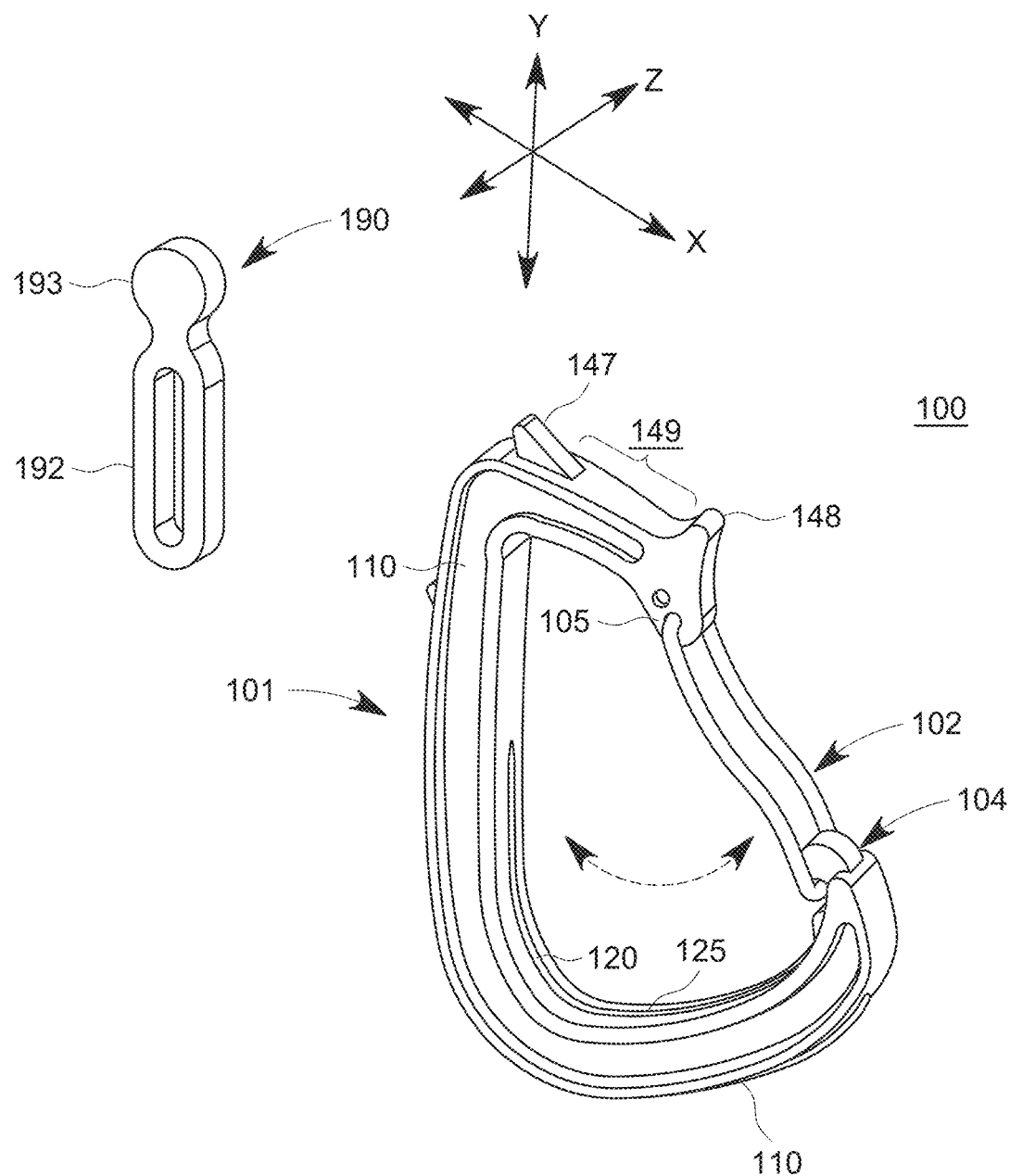
FIG. 1 is a first perspective view coupling link assembly according to one embodiment.
Figure 2:
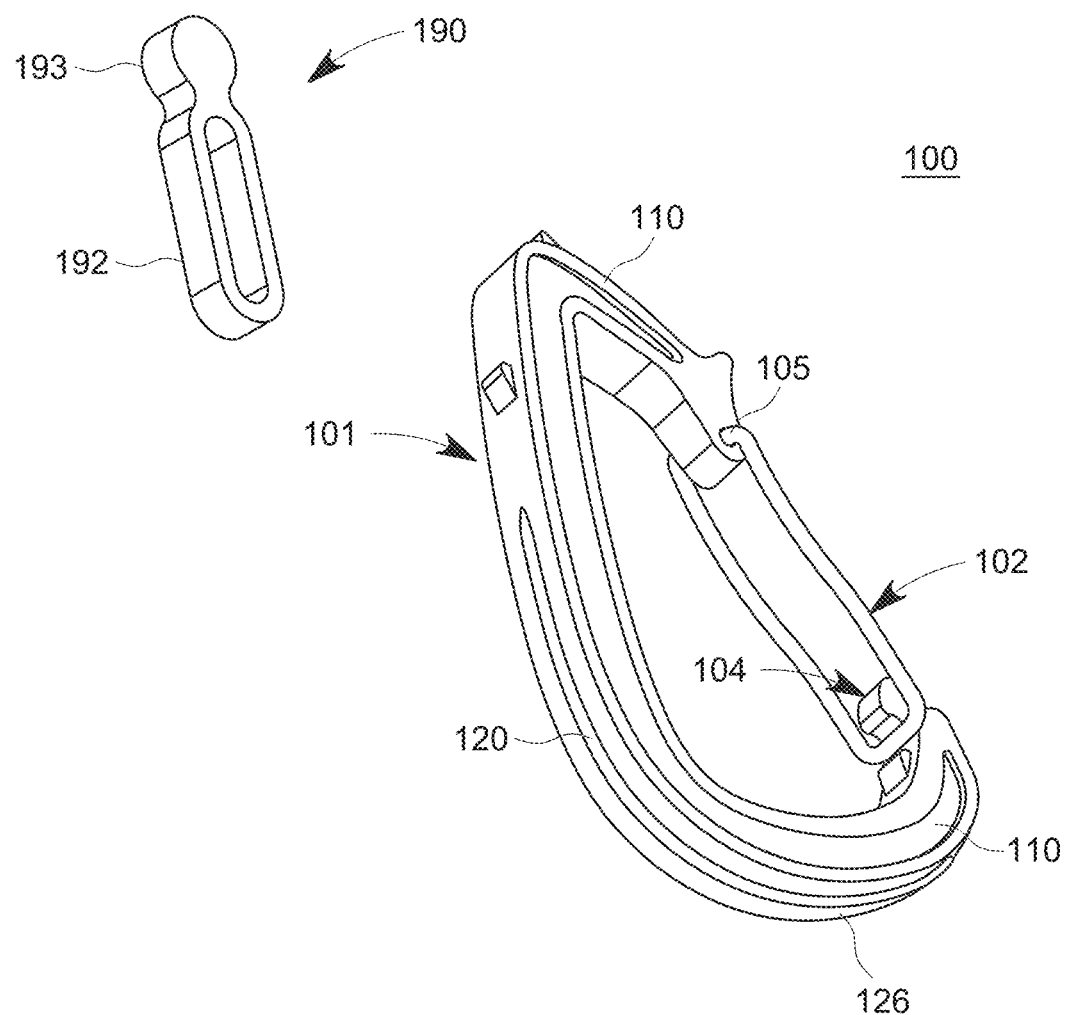
FIG. 2 is a second perspective view of the coupling link assembly of FIG. 1.

FIGS. 1 and 2 show a coupling link assembly (hereinafter 'assembly') 100 according to one embodiment. In this embodiment, the assembly 100 includes substantially C-shaped coupling link (hereinafter 'link') 101 and a keeper 190. The link 101 is substantially C-shaped in this embodiment in that it has an overall C-shape similar to a carabiner; however, it should be understood that the link can be modified as desired to suit particular functions or provide desired features. A spring-loaded gate 102 is connected to the link 101 through aperture 105. The gate 102 is configured to swing inwardly, as depicted by the double-headed dashed arrow in FIG. 1 and is prevented from swinging outside of the link 101 by confrontation with stop member 104 as illustrated.

Figure 3:
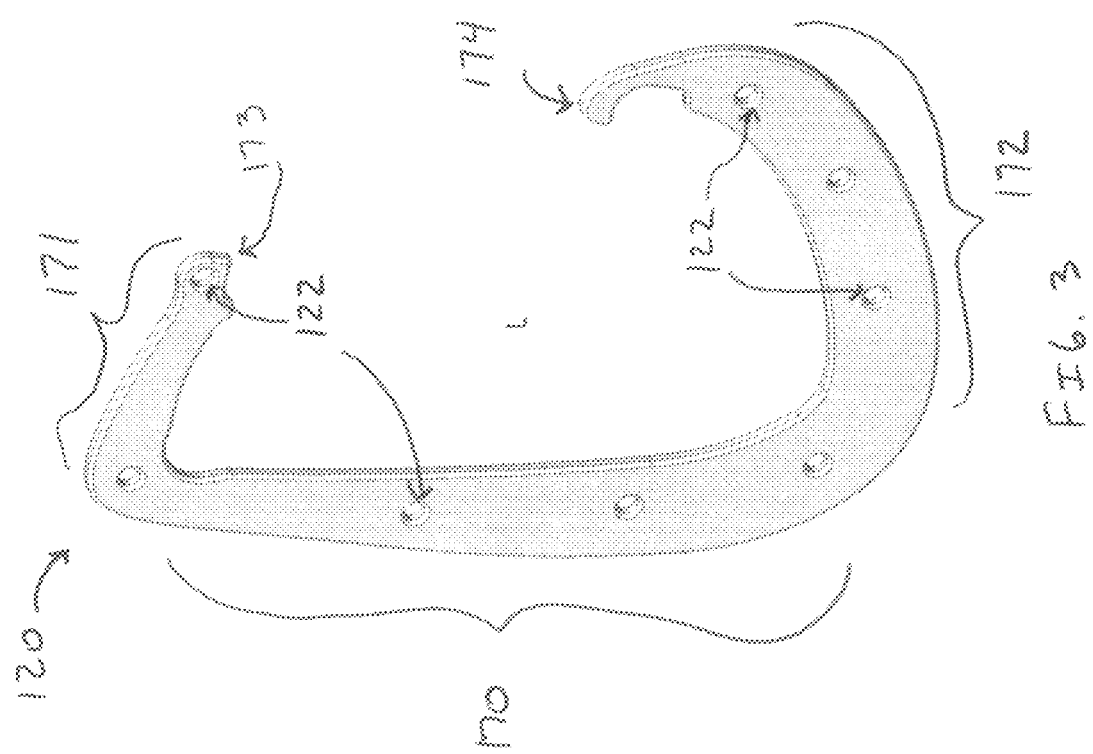
FIG. 3 shows a backbone component of a coupling link according to one embodiment.

Referring also to FIG. 3, in this embodiment the link 101 includes a rigid core structural member (hereinafter 'structural member') 120 situated in the center of the link 101, within the x-y plane cross-section according to the convention of FIG. 1, that is over-molded with a resilient plastic overcoating 110. One non-limiting example of the structural member 120 material is stainless steel. One non-limiting example of a suitable resilient plastic of the overcoating 110 is Nylon 6/6 with a glass fill. The percentage of glass fill preferably ranges from 25% to 35% with an optimum of 30% by weight. It should be understood that other suitably resilient plastics may be used as alternatives. In this embodiment, the structural member 120 is substantially flat and C-shaped so as to define the overall shape of the link 101, and the plastic overcoating 110 provides thickness of the link 101, and certain features such as grips, protrusions and anchors for the keeper 190, explained in greater detail below.

Referring to FIG. 3 in particular, in this embodiment, the structural member 120 is rigid and substantially C-shaped, and includes a spine portion 170, an upper arm portion 171 with an upper terminus 173 and a lower arm portion 172 with a lower terminus 174. The structural member 120 is substantially C-shaped in that the upper arm 171, spine 170 and lower arm 172 form an open loop with a gap between the upper terminus 173 and lower terminus 174 and has an overall shape similar to a carabiner. The structural member 120 is preferably formed of a metal or metal alloy such as steel or stainless steel. The structural member 120 further includes a plurality of apertures 122 as illustrated, so that during manufacturing the plastic overcoating 110 may flow therethrough, providing increased coupling strength between the plastic overcoating 110 and the structural member 120. It should be understood that the placement of the apertures 122 in FIG. 3 is exemplary, and that other aperture patterns and placements can be adopted according to preference.

Figure 4:
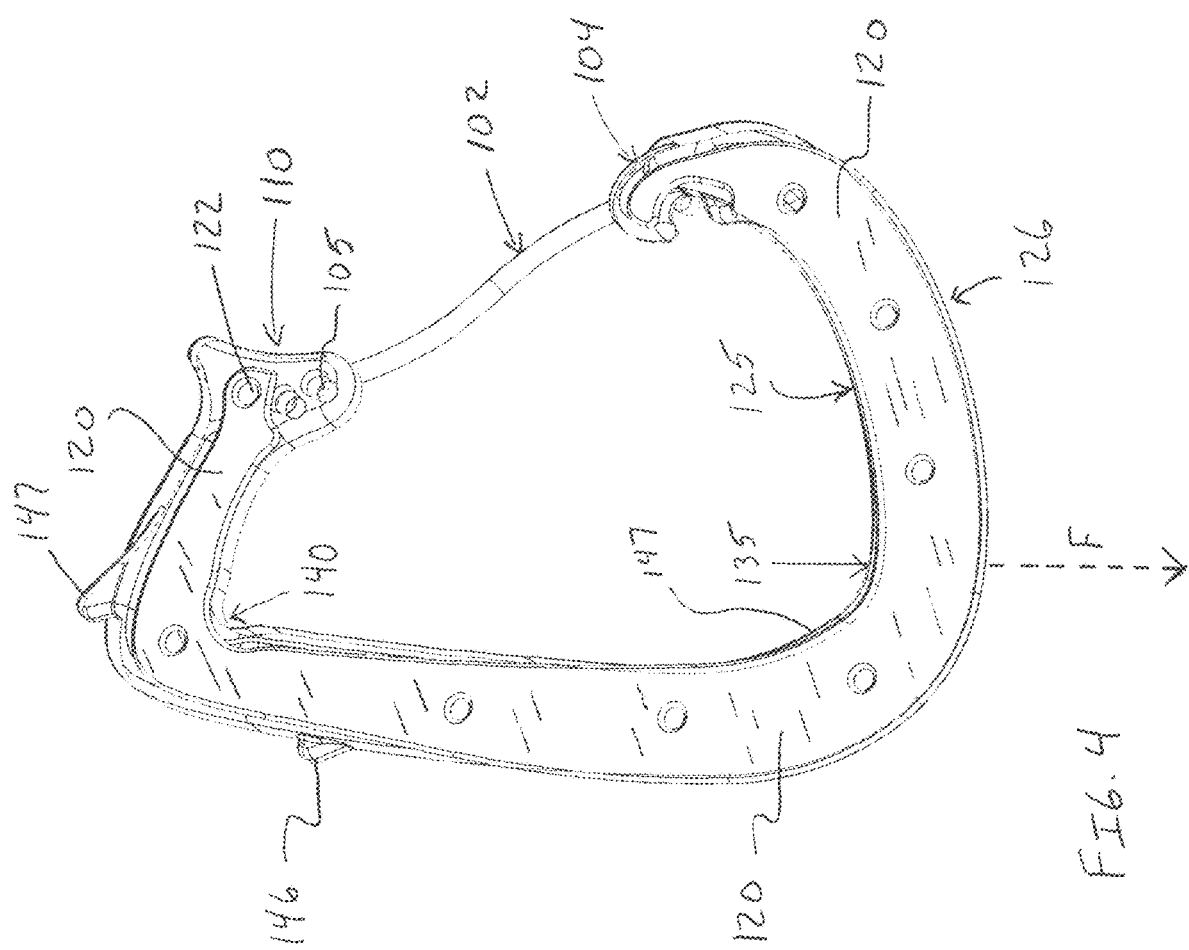
FIG. 4 is a first sectional view of the coupling link of FIG. 1.

FIG. 4 illustrates a cross-section of the link 101 through the x-y plane according to the convention of FIG. 1. In this embodiment, the plastic overcoating 110 substantially follows the shape and contour of the inner structural member 120. However, in this embodiment, at certain select positions, the structural member 120 is exposed and not covered by the plastic overcoating 110. In general, such select positions can include those areas of the link 101 where abrasion from other objects may occur, such as at the 'bottom' portions 125, 126 of the link 101 where tools or other materials make contact with the link 101, and other areas.

Figure 5:
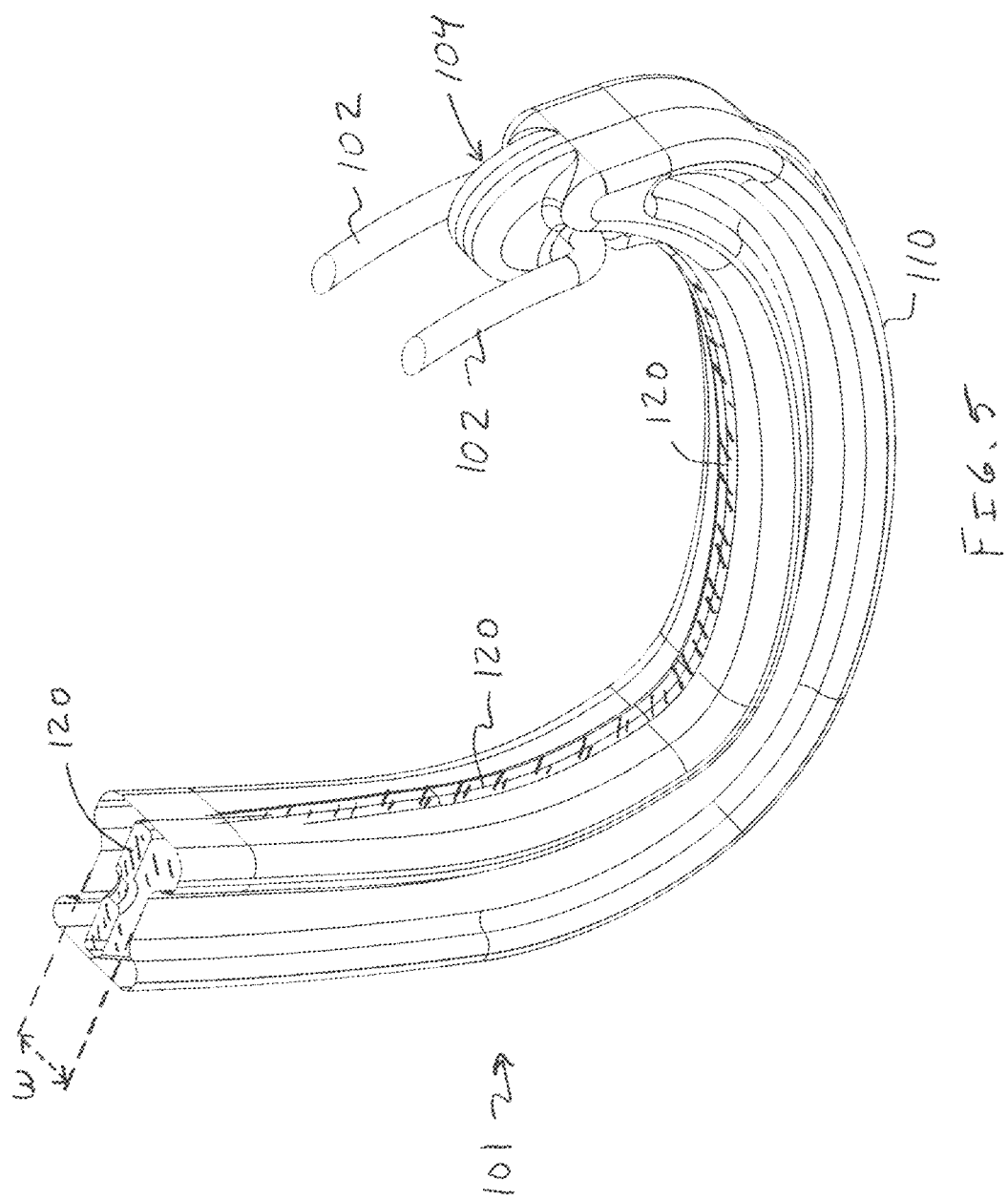
FIG. 5 is a second sectional view of the coupling link of FIG. 1.

Referring now to FIG. 5, a cross-section of the link 101 through the x-z plane is shown, again, according to the convention of FIG. 1. As is evident, in this embodiment, the structural member 120 forms approximately one-half to one-third of the structural width w of the link 101. However, referring back to FIG. 4, the link 101 is intended to be used for supporting weight between upper anchor portion 140 and lower support portion 135. Thus, the link 101 is configured to oppose forces/in the direction depicted, wherein the load is supported by the structural member 120, along with the plastic overcoating 110. Although the link 101 can resist torsion in directions orthogonal to the force load, its thickness in the x-y plane yields exceptional strength while reducing the overall weight of, for example, a similar link formed entirely of stainless steel.

Figure 6:
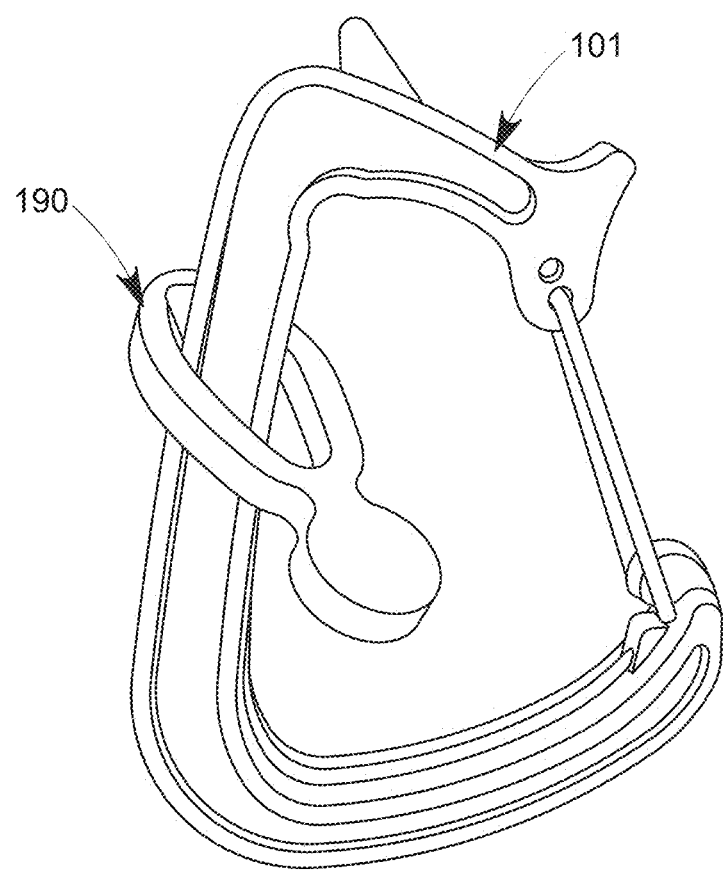
FIG. 6 is a photograph of a coupling link assembly according to one embodiment.
Figure 7:
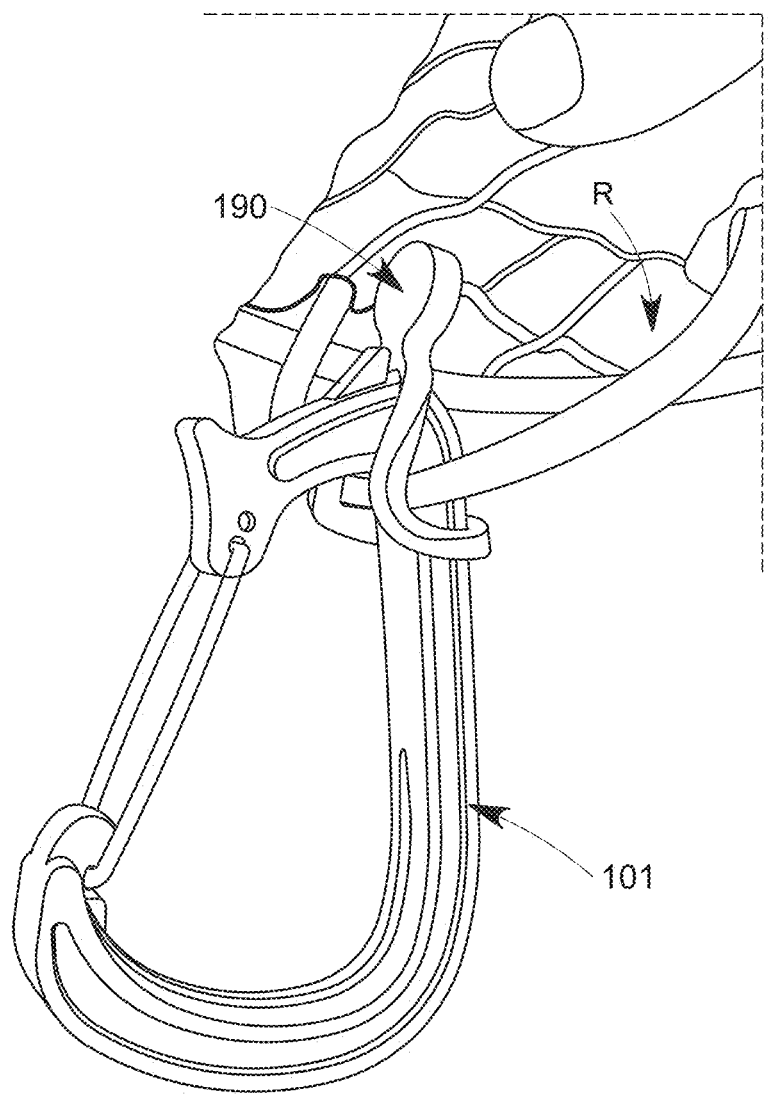
FIG. 7 illustrates the coupling link of FIG. 6 in an operative configuration, according to one embodiment, attached to a climbing harness component.

Referring now to FIGS. 6 and 7, the assembly 100 is shown in an operative configuration. In this example, the keeper 190 is first attached to the link 101 by feeding the link 101 through the loop 192 of the keeper 190. Next, the link 101 is attached to a portion of a climbing harness, in this example, gear ring R. Utilizing notches 146 and 147 (FIG. 4), keeper 190 is fed around the gear ring R as shown. Keeper 190 can be formed of a resilient and flexible material, such as rubber, that engages the gear ring R and prevents or minimizes movement of the link 101 on the gear ring R. FIG. 7 shows that the keeper 190 and the notches 146, 147 cooperate to pull the link 101 and the gear ring R together in the configuration shown. To move the link 101, a user can grip the tab portion 193 of the keeper 190 over notch 147, reposition the link 101, and then reset the keeper 190 as illustrated.

Figure 8:
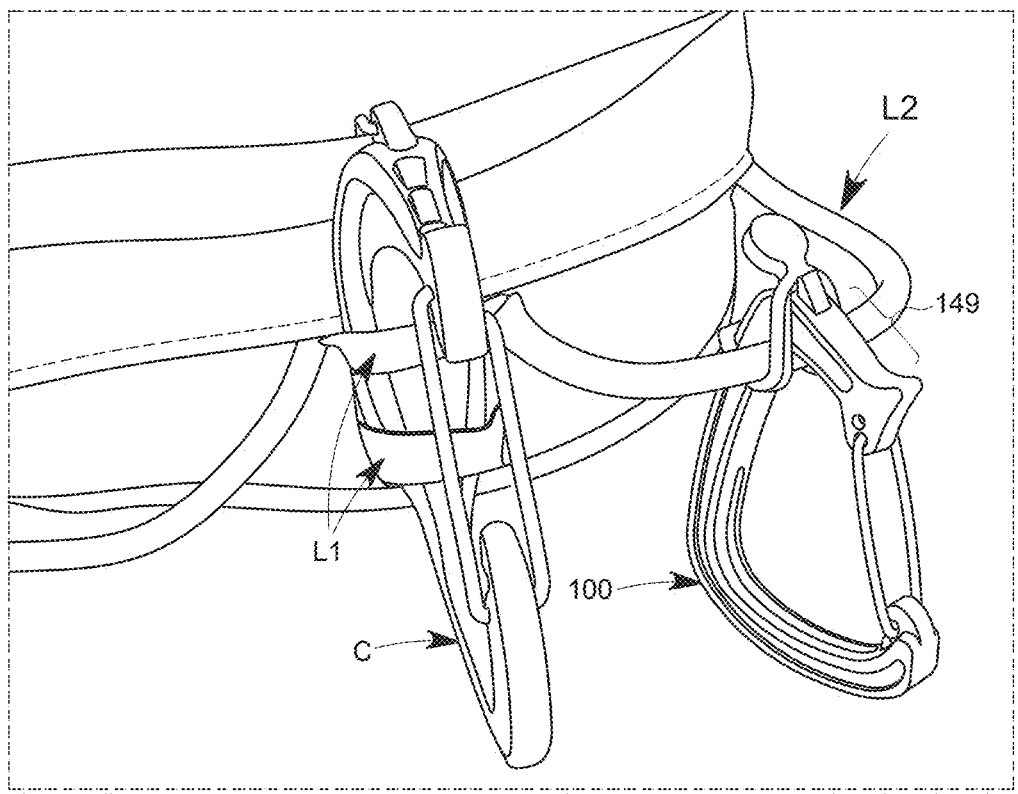
FIG. 8 illustrates the coupling link of FIG. 6 operatively connected to a climbing harness and, comparatively, a prior art coupling link operatively connected to the climbing harness.

FIG. 8 illustrates the assembly 100 attached to a climbing harness loop L2. For comparison, a prior art carabiner C is illustrated attached to the climbing harness at loops L1. As is the case with many climbing harnesses, loops L1 are specifically intended for attaching carabiners. However, usually there are only two such loops on either side of the harness, leaving more room for the larger loops L2 to attach climbing gear. One advantage of the assembly 100 is that additional links 101 may be attached to the larger loops L2, providing a climber with increased versatility in his gear storage options.

Referring to FIGS. 1 and 8, in this embodiment, the link 101 includes a staging shelf 149 disposed between notch 147 and protrusion 148. The staging shelf 149 serves to support and provide easy access to various climbing tools, for example, ice screws, slings, axe and other implements. The shape and size of the staging shelf 149, notch 147 and protrusion 148 can be customized for the accommodation of any tool a climber may carry.

Climbers often prefer to place equipment on a climbing belt in preferred locations that allow easy and unencumbered access to climbing tools and the like. While some climbing belts have pre-formed loops and other attachment points to attach tools, carabiners, etc., it can be preferable to have absolute control over placement of such articles. Accordingly, in this and other embodiments, an adjustable band assembly can be utilized to place assemblies of the type described herein at exact locations on a wearer's climbing belt.

Figure 9:
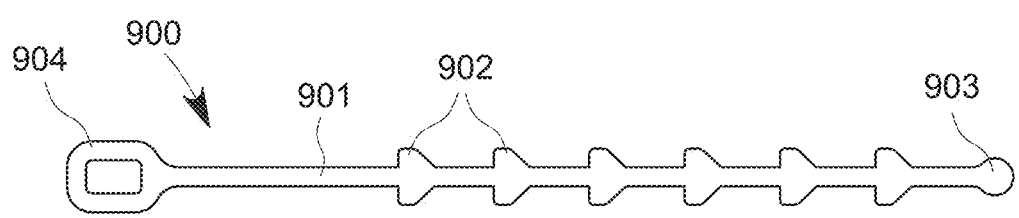
FIG. 9 shows one component of a keeper assembly, according to one embodiment.

Referring now to FIGS. 9 and 10, an adjustable band 900 is shown according to one embodiment. In this embodiment, the band 900 includes an elongate spine 901 of resiliently-flexible material. In one embodiment, the material is rubber, although other resiliently flexible materials may be used. In this embodiment, along the length of the spine 901 exist a plurality of triangular protrusions 902 (only two protrusions 902 are highlighted in FIG. 9) as shown. The spine 901 terminates at a distal end portion 903, which has a bulbous shape for grasping by the user, the purpose of which is explained in greater detail below. On the opposite proximal end, the spine 901 terminates with a loop 904, as shown.

Referring to FIGS. 10A-10C, a resiliently-flexible keeper 1000 is shown according to one embodiment. The band 900 and the keeper 1000 cooperate to form an attachment assembly for securing a link 101 to an exact chosen location on a climbing belt. In this embodiment, the keeper 1000 includes a square aperture 1010. The square aperture 1010 is configured to allow a bottom portion of link 101 to be passed therethrough and be positioned at the bottom elbow 147 (FIG. 4) of the link 101.

In this embodiment, the keeper 1000 includes a keyhole aperture 1020. The keyhole aperture 1020 is configured to allow the spine 901 of the band 900 to pass therethrough. The triangular protrusions 902 of the band 900 may be urged through, or twisted to align with the long axis of the keyhole aperture 1020. After a triangular protrusion 902 of the band has passed through the keyhole aperture 1020, it must be rotated to allow the spine to be removed from the keeper 1000. In this way, the band 900 and the keeper 1000 can cooperate to reversibly lock together.

Figure 11:
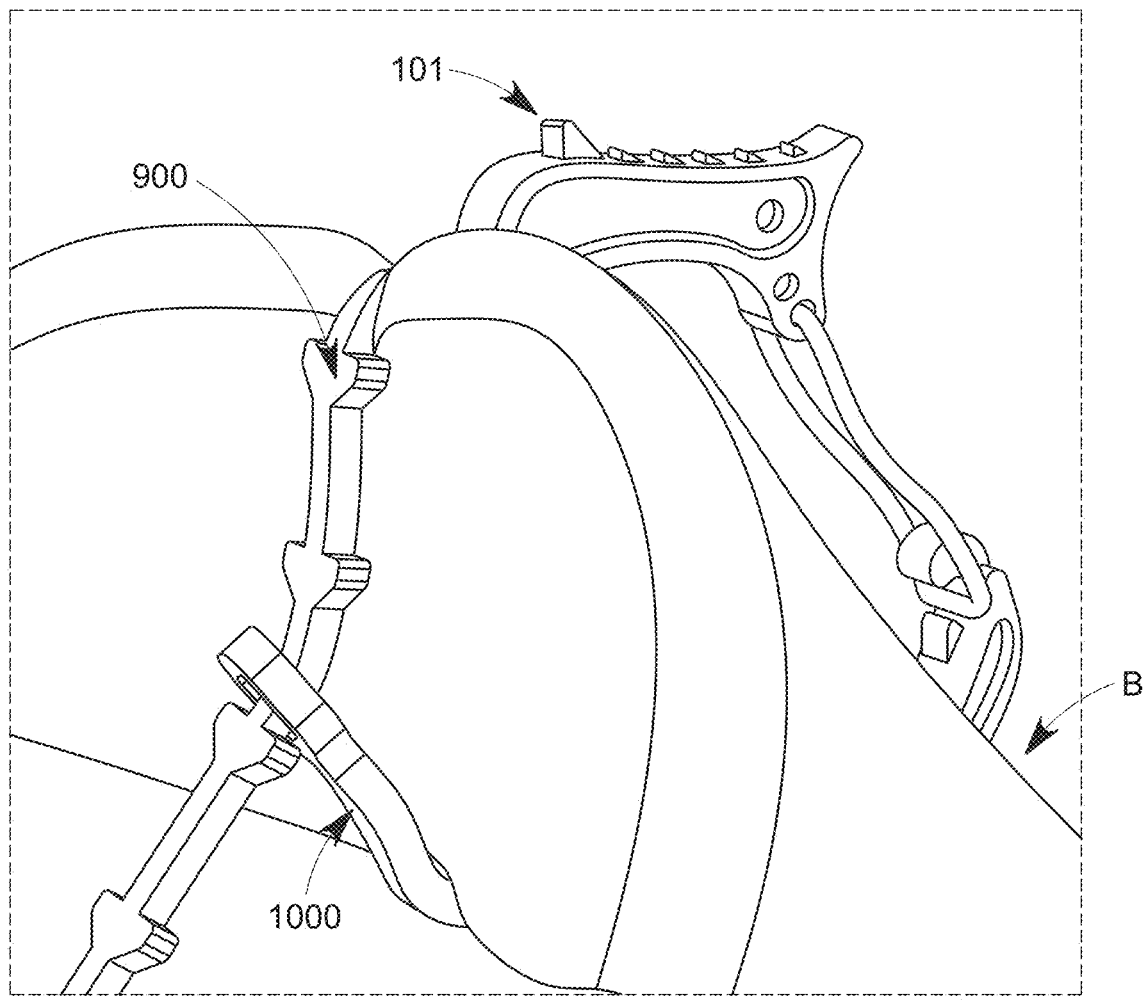
FIG. 11 shows a coupling link assembly attached to a climbing belt according to one embodiment.

Referring now to FIG. 11, the band 900 and keeper 1000 are shown cooperatively holding a link 101 to a selected area of a climbing belt B. In this example, the loop 904 of the band 900 is positioned near the top of the link 101, for example, at upper anchor portion 140 (see, e.g., FIG. 4), and the square aperture 1010 of the keeper 1000 is positioned at elbow 147. In this example, the spine 901 of the band 900 has been passed through the keyhole aperture 1020 of the keeper 1000 and tightened to a chosen tension. As illustrated, the triangular protrusion 902 prevents the spine 901 from reversing through the keyhole aperture 1020, and the band 900/keeper 1000 assembly can be used to position the link 101 anywhere along the belt B that the user choses. It should be understood that the triangular shape of protrusions 902 is but one of many shapes that may be employed. In general, the shape of the protrusion is one that allows forward movement through the keyhole aperture 1020 with relative ease, but when the spine 901 is reversed, the protrusion catches on the keyhole aperture to prevent or restrict its movement therethrough.

A number of illustrative embodiments have been described. Nevertheless, it will be understood that various modifications may be made without departing from the spirit and scope of the various embodiments presented herein. Accordingly, other embodiments are within the scope of the following claims.

What is claimed is:

1. A coupling link assembly, comprising:
   a rigid, substantially C-shaped structural member formed of a metal or metal alloy, said rigid, substantially C-shaped structural member being a generally planar metal or metal alloy plate lying substantially in a plane and defining a perimeter shape of the coupling link, and comprising:
   an upper arm portion having an upper terminus;
   a lower arm portion having a lower terminus; and a spine portion between said upper arm portion and said lower arm portion;

a gate connected to said upper terminus, moveable between an open position and a closed position with respect to said lower terminus; and an overmold of a rigid plastic material molded around and following a contour of said rigid, substantially C-shaped structural member;

wherein a portion of said rigid, substantially C-shaped structural member remains exposed through the overmold along an inner surface of the coupling link assembly between said upper arm portion and said lower arm portion; and wherein said rigid, substantially C-shaped structural member includes a plurality of through-apertures distributed along a length of said rigid, substantially C-shaped structural member through which the overmolded material extends.

2. The coupling link assembly of claim 1, wherein said rigid, substantially C-shaped structural member is formed of steel or stainless steel.

3. The coupling link assembly of claim 1, wherein said overmold is comprised of Nylon 6/6 with a glass fill.

4. The coupling link assembly of claim 3, wherein said overmold is comprised of a glass fill in the range of 25% to 35% by weight.

5. The coupling link assembly of claim 1, wherein a portion of said rigid, substantially C-shaped structural member protrudes through said overmold between and including an inside surface between said upper arm portion and said lower arm portion.

6. The coupling link assembly of claim 1, wherein a portion of said rigid, substantially C-shaped structural member protrudes through said overmold along an inner surface of said lower arm portion, an inner surface of a lower elbow portion between said lower arm portion and said spine, and a portion of an inner surface of said spine.

7. The coupling link assembly of claim 1, wherein said overmold comprises first and second protrusions on a top surface of said upper arm portion to form a tool support surface therebetween.

8. The coupling link assembly of claim 7, wherein said first protrusion is adjacent said upper terminus, and said second protrusion is adjacent an upper elbow formed between said spline and said upper arm portion.

9. The coupling link assembly of claim 7, wherein said tool support surface comprises a plurality of ridges for accommodating a plurality of tools.

10. The coupling link assembly of claim 8, further comprising a third protrusion formed on an outside surface of said overmold on said spine portion, proximal to said upper elbow.

11. The coupling link assembly of claim 10, further comprising a first keeper, said first keeper comprising:

a body formed of a resiliently flexible material, an upper gripping portion and a lower portion comprising an elongate aperture adjacent to said upper gripping portion.

12. The coupling link assembly of claim 11, wherein said first keeper is configured to bias said upper elbow against an attachment member of a climbing belt or harness to restrict movement of said coupling link.

* * * * *